United States Patent Office 3,268,350
Patented August 23, 1966

3,268,350
FOAMABLE SILICATE COMPOSITION
John J. Grebe, John F. Miller, Wayne L. Rhinehart, and Thomas R. Wayt, Midland, Mich., assignors to The Dow Chemical Company, Midland, Mich., a corporation of Delaware
No Drawing. Filed June 13, 1962, Ser. No. 202,057
2 Claims. (Cl. 106—75)

This invention relates to foams and more particularly is concerned with inorganic silicate foams, a process for their preparation and products prepared therefrom.

It is a principal object of the present invention to provide a lightweight, fireproof foam.

It is another object of the present invention to provide a foamable composition that can be foamed without using chemical foaming agents as are conventionally employed.

It is a further object of the present invention to provide an inorganic silicate glass foam which has a relatively slow set time, is easy to handle during molding and possesses a uniform cell structure.

It is an additional object of the present invention to provide an inorganic foamed product having excellent thermal insulating properties which product can be used at high temperatures.

These and other objects and advantages will be apparent from the detailed description presented hereinafter.

The foamable composition of the present invention comprises a mixture of $Na_2O$ (sodium oxide) and $SiO_2$ (silicon dioxide) of $Na_2O/SiO_2$ proportions ranging on a molar basis from about 1/1.2 to about 1/3.5 and preferably from about 1/1.2 to about 1/1.6 plus one or more metal oxides from Groups IA, IIA, IIIA, IVB, VIB, VIIB, and VIII of the periodic table as presented in "Handbook of Chemistry and Physics," 41st ed., pp. 448–449, Chemical Rubber Publishing Co., Cleveland, Ohio (1960). Hereinafter, the term "metal oxide" refers to the oxides in this latter group of additives and excludes sodium oxide.

The minimum concentration of metal oxide to be employed in the composition is that amount whereby a desirably high crush strength is imparted to the product foam. Metal oxide concentrations as low as about 3 to 4 percent have produced foams showing very satisfactory crush strengths. Concentrations of metal oxide as high as 30 percent or more can be used.

The metal oxides can be used alone or as mixtures in the mix. A convenient source of these materials are the residues (slags) of native ores such as the hematite iron ores and taconite iron ores from which substantially all of the iron values have been removed. To illustrate, the nominal concentrations of impurities present in iron ores which normally end up in slag as set forth in Iron Ore, published by American Iron Ore Association, Cleveland, Ohio (1958) and "Iron Ores Analyses and Data 1959," published by the M. A. Hanna Company, Agent, Cleveland, are as follows. (The percentages shown refer to the metal oxide.)

| | Percent |
|---|---|
| Manganese | 0.5 to 14 |
| Aluminum | 0.3 to 8 |
| Calcium (as lime) | 0.03 to 4 |
| Magnesium | 0.06 to 4 |

These ore residues provide the additional advantage of furnishing a large amount of the silica required in the composition as silicon dioxide comprises from about 2 to 20 percent of these native materials and up to 45 percent or more of some of the siliceous type ores.

If the high silica containing residues obtained from iron production are employed, these ordinarily will contain an excess of $SiO_2$. Sodium oxide values can be added to establish the operable $Na_2O/SiO_2$ ratio. With low silica containing ores excess of silicon dioxide will be added to insure the proper ratio of reactants.

If the composition is prepared from individual components, the $SiO_2$ concentration is calculated in accordance with the total predetermined ratio of $Na_2O/SiO_2$ desired in the composition.

The maximum amount of sodium oxide to be used is somewhat less than that required for sodium silicate ($Na_2O \cdot SiO_2$) formation since a portion of the silicon dioxide enters into reaction with the metal oxides to form the corresponding silicate or metal oxide-silicon dioxide complex oxide.

Although the sodium values employed are expressed herein as sodium oxide, conveniently this alkali metal base is introduced into the foamable composition as sodium hydroxide or sodium carbonate instead of the oxide itself.

Likewise, metal oxide formers, such as metal hydroxide, hydrolyzable metal salt or other metal compounds which are decomposed or transformed into the oxides during the original fusion glass slag producing reaction can be employed as the metal oxide source.

As has been shown hereinbefore, the foamable novel composition readily can be prepared by fusing the individual components or by incorporating sodium oxide and/or silicon dioxide values as required into the residues remaining from conventional iron ore reduction practices. Advantageously, however, the present novel foamable composition can be produced directly in an iron producing process wherein a mixture of an iron ore associated with siliceous material, a carbonaceous substance and sodium hydroxide, sodium oxide or sodium carbonate is heated to a temperature sufficient to render the iron molten. In this process a fixed carbon/$Fe_2O_3$ molar ratio of 0.5 to 4.5 is employed and $Na_2O/SiO_2$ molar ratio of from 0.25 to 4 is used.

A sodium silicate glass-like slag having metal oxide silicates in combination therewith is coproduced with the metallic iron. The incorporation of additional reactants, if any are needed to give the foamable composition as set forth hereinbefore, readily can be made to the molten slag as produced. Alternatively, the ingredients can be mixed with the solidified cold product, preferably finely divided, to give the operable composition and this subsequently fused.

In preparing the foams, generally the solidified metal silicate-sodium oxide glass mixture resulting either from the ore processing or by direct fusion, is mixed with water and heated, with or without agitation, while permitting water to vaporize from the system. The heating is continued until a viscous solution, having the consistency of a molten tar, results and a skin or film forms on the exposed surface of the reaction mass. The viscous material then is poured into a mold in which foaming is to take place. The mold is equipped with a gas vent. The mass in the mold is rapidly heated to a temperature at least that at which steam is formed in the system whereby water is removed from the mass as steam. As the water vapor leaves the mass, the melting point of the mass is increased and its water solubility decreased. As the heating proceeds, small water vapor gas bubbles are trapped within and throughout the formed mass thereby providing a light weight multi-cellular foam. The cells communicate one with another within a given molded form. The foamed product as produced has a substantially smooth pore-free solid surface. Therefore each molded foam unit in reality provides a solid surface skin or outer layer beneath which is entrapped the cellular insulating network of voids or connected cells.

The silicate-sodium oxide foamable composition preferably is particulated prior to mixing with the water. Ordinarily particles of from about 0.05 to about 0.25 inch are employed although larger or smaller particles can satisfactorily be used. Small particles provide a greater surface area and therefore an increased rate of solution in the water.

In the aqueous reaction mixture, 100 parts by weight of the solid silicate-sodium oxide fused product will be used with from about 40 to about 400 parts or more by weight water. Ordinarily about equal weights of the solid and water are used.

The time of heating to effect solution of the silicate-sodium oxide glass will vary depending upon the type of evaporator employed, the total heat energy utilized and the amount of reactants as is apparent to one skilled in the art. As an illustration, about 1500 grams each of powdered foamable solid and water in an open stainless steel beaker were heated at boiling temperatures over an electric hot plate. The mix was stirred continuously by means of a mechanical stirrer during the heating. After about one hour, a thick viscous, but still pourable, mass remained. Analysis indicated about 25% of the water had been evaporated. This material when poured in a mold and heated gave a very satisfactory foam.

The actual foaming temperatures to be employed are from about 300° to about 700° C. and preferably from about 400° to about 500° C. The foaming readily can be carried out by placing the mold and contents directly in an oven or heating by other means apparent to one skilled in the art.

The time required for completion of foaming is dependent primarily on the size of the foamed article and the foaming temperature employed. Ordinarily foaming times of from about several minutes to several hours or more are used. A test specimen 2 inches thick and 4 inches square prepared from the illustrative solution described directly hereinbefore was completely foamed at a temperature of 450° C. in 60 minutes. Continuing the heating for additional periods did not alter or adversely affect the foamed product.

To facilitate removal of the foamed product from the mold after foaming, a layer of asbestos paper, kraft paper or other similar material which is not wetted by the viscous solution can be employed as a mold lining. Kraft paper was found to be most satisfactory as this was not wetted by the liquid foamable composition and after the foaming operation was either charred or flake carbonized. This could be easily brushed or removed from the surface of the molded foam by light abrasive action, as by sanding.

If no lining was employed in the foaming process it was found that the foamed product tenaciously adhered to the mold wall. This product and process therefore unexpectedly provides a means for producing insulating construction panels for building purposes, refrigeration assemblies, etc. in a single operation. The outer walls of the laminate can be of metal, wood, glass and the like materials which can be subjected to the foaming temperatures. These can be assembled so as to actually be the mold container or alternatively can be employed as lining in other molds. The foamable liquid composition of the present invention can be placed therein and foamed whereby an extremely strong bond is formed joining these in a unitized structure.

Alternatively, the foam can be produced in a predetermined shape using the hereinbefore described molding procedure. The material can be removed from the mold and joined to covering materials by adhesives to provide laminated structures. This latter procedure is employed for preparing fabrications when the covering material is not stable to the foaming temperature or may be attacked in a detrimental manner by the alkaline liquid foamable composition.

The resulting foamed product can be crushed, ground or otherwise particulated and used in this form as a light weight aggregate filler, for pour insulation, etc.

The foamed product can be coated with a glazing compound or other coloring agent used with ceramics and the so-coated foamed product then can be fired. In this operation, the ceramic coating becomes a part of the surface of the foam and imparts a permanent color to the product.

Cuttings, rejects, grinding wastes and the like resulting from the production of the foamed product are not lost but readily can be reprocessed through the solution forming stage and refoamed. Since no adulterant or "chemical" foaming agent is used in the process, the foamable compositions can be reconstituted merely by adding water to a product that has been taken through the foaming step.

The following examples will serve to illustrate further the present invention but are not meant to limit it thereto.

*Example 1*

A weighed portion of hematite iron ore having the following composition:

| | Percent |
|---|---|
| $Fe_2O_3$ | 86.5 |
| P | 0.1 |
| $SiO_2$ | 2.5 |
| $MnO_2$ | 0.7 |
| $Al_2O_3$ | 0.8 |
| CaO | 0.0 |
| MgO | 0.0 |
| S | 0.02 |
| Volatile (lost on ignition) | Balance | was blended with a finely divided coal (fixed carbon content 92.4%) and flake caustic (NaOH) to give a total mix of about 5 pounds having a $C/Fe_2O_3$ ratio of 3 and a $SiO_2/Na_2O$ ratio of 1. The mix was heated in a No. 10 plumbago crucible over a gas flame to a temperature of about 1450° C. at atmospheric pressure. The mix was maintained at the indicated temperature for about 50 minutes. Following this reaction period the molten mass was poured into a graphite crucible whereupon two layers formed. The more dense phase was substantially all metallic iron and the lighter phase was a green, glass-like, alkali silicate based slag. Following cooling and sodification, the two phases readily were separated.

This glass phase analyzed as follows:

| | Percent |
|---|---|
| $Fe_2O_3$ | 0.2 |
| $SiO_2$ | 40.1 |
| $MnO_2$ | 2.5 |
| $Al_2O_3$ | 21.5 |
| CaO | 0.8 |
| MgO | 0.7 |
| S | 0.2 |
| $TiO_2$ | 0.9 |
| $Na_2O$ | 32.6 |

The presence of CaO and MgO in the glass results from the presence of these values in the coal used as reductant.

The $Na_2O/SiO_2$ molar proportion in this glass is about 1/1.27.

The glass was reduced to approximately pea size particles in a jaw crusher mill and the small amount of metallic iron globules carried into the glass during the reduction stage substantially completely was removed by magnetic action. The glass was further comminuted on a micro-pulverizer. Following this operation, the last of the metallic iron was removed therefrom by magnet.

About 100 grams of the powdered glass was placed into a 500 milliliter stainless steel beaker and about 100 grams of distilled water was added with stirring. The resulting mixture was heated to boiling with continuous stirring and this action continued until about 20 percent of the water had evaporated. This took about one hour. This resulting mixture was a thick viscous liquid having a thin skin on its surface.

The viscous liquid was poured into an iron mold in the shape of a regular prism having a removable top. The mold cavity was about 6½ inches on a side and about 1 inch thick. The mold was lined with a heavy kraft paper. A volume of the foamable composition equal to about 0.6 the volume of the mold cavity was used. After the mold had been filled, the top was attached and the mold and contents placed in a preheated oven maintained at about 400° C. As the mass became heated, steam escaped through a 0.25 inch diameter outlet in the top of the mold. After about 60 minutes, the mold was removed from the oven, cooled and the lightweight foamed product removed therefrom.

The product had carbonized paper clinging to its outer surfaces which was easily removed by light abrading action. The outer wall surfaces of the foamed product were smooth and pore free. Sectioning the product indicated an internal structure of substantially homogeneous connected cells.

Example 2

Using the same procedure as described for Example 1, a similar light weight foam was produced from a glass obtained in the caustic-carbon reduction of a taconite iron ore. The glass produced analyzed to have the following composition:

| | Percent |
|---|---|
| $Fe_2O_3$ | 7.7 |
| $SiO_2$ | 53.1 |
| $MnO_2$ | 1.7 |
| $Al_2O_3$ | 1.3 |
| CaO | 0.8 |
| MgO | 0.6 |
| S | 0.2 |
| $TiO_2$ | 0.6 |
| $Na_2O$ | 31.4 |

The $Na_2O/SiO_2$ molar proportions of this glass are 1/1.75.

A number of runs were made in which foams were prepared either directly from this glass product or where excess metal oxide values were incorporated into the mix prior to or during the liquification stage in the foaming process. The foamable liquid and foams themselves were produced following the same procedure described in Example 1.

Table 1 which follows summarizes the results of these runs.

Example 3

The glass composition as used in Example 2 was used to prepare a metal-foamed glass sandwich panel. For this operation stainless steel linings of about 1/32 inch thick and about 6½ inches square were placed in the mold. The viscous foamable liquid was then placed into the mold and foamed as described in Example 1. As the resulting laminate was removed from the mold, it was found that the glass foam had adhered tenaciously to the metal surface forming a sandwich panel with a foam glass core about 1 inch thick and outside skins of stainless steel. The glass-to-metal bond of these panels was exceedingly strong and the outer metal coverings could not be ripped from the core without actually destroying the core itself.

In a manner similar to that described in the foregoing examples, a composition containing $Na_2O$ and $SiO_2$ in molar proportions of about 1 to 3½ can be admixed with about 10 percent aluminum oxide and this fused to provide a silicate type glass material. The resulting glass can be crushed and a mixture containing about 100 parts of the solid and about 50 parts water can be prepared. This mixture can be heated to produce a thick viscous solution which subsequently can be foamed at a temperature of about 300° C.

Additionally, a mixture of sodium oxide and silicon oxide having $Na_2O/SiO_2$ proportions of ½ and containing about 3 percent MgO can be fused into a glass. This glass can be crushed into finely divided form and about 100 parts of this glass can be admixed with about 400 parts water. This mixture can be heated until a thick viscous liquid results. This material can be foamed by heating at about 700° C. The resulting foam after removal from the mold can have a plywood cover placed on one of the wall surfaces and a plaster type wall board material placed on the other. These readily can be fastened to the foam by means of common adhesive materials used in the construction art as is understood by one skilled in this art. The resulting sandwich panel provides a lightweight unit having excellent thermal resistances and a fire proof core.

Various modifications can be made in the present invention without departing from the spirit or scope thereof for it is understood that we limit ourselves only as defined in the appended claims.

We claim:
1. A foamable silicate composition which comprises; sodium oxide and silicon dioxide having a $Na_2O/SiO_2$ molar proportion of about 1/1.3 and contains on the total composition weight about 21.5 weight percent $Al_2O_3$, about 2.5 weight percent $MnO_2$, about 0.8 weight percent CaO, about 0.7 weight percent MgO, about 0.9 weight percent $TiO_2$ and about 0.2 weight percent $Fe_2O_3$.

TABLE I

| Run No. | Reactants | | Additive | | Solution Formation | | Foaming Conditions | | Foam Density (g./cc.) | Remarks |
|---|---|---|---|---|---|---|---|---|---|---|
| | Glass (g.) | $H_2O$ (g.) | Type | Grams | T., °C. | Min. | T., °C. | Min. | | |
| 1 | 500 | 500 | | | 104 | 50 | 450 | 60 | 0.38 | Grey colored foam, uniform cell structure, no breaks or cracks. |
| 2 | 100 | 100 | CaO | 1.0 | 90 | ¹ 960 | 300 | 30 | | Good strong foam. |
| 3 | 500 | 250 | CaO | 10.0 | 90 | ¹ 960 | 300 | 30 | | Do. |
| 4 | 200 | 200 | $CaCl_2$ | 1.0 | (²) | 35 | 450 | 60 | | Liquid was more viscous than glass alone. Good, strong foam. |
| 5 | 500 | 250 | $Al_2O_3$ | 25 | 90 | ¹ 960 | 400 | 60 | | Good strong, low density foam. |
| 6 | 1,000 | 500 | $Al_2O_3$ | 100 | 90 | ¹ 960 | 400 | 60 | | Good strong very low density foam. |
| 7 | 200 | 200 | $Al_2(SO_4)_3$ | 10 | (²) | 60 | 450 | 60 | 0.3 | Good strong foam. |
| 8 | 200 | 200 | $Al_2(SO_4)_3$ | 1 | (²) | 40 | 450 | 60 | | Do. |
| 9 | 200 | 200 | $B_2O_3$ | 2 | (²) | 30 | 450 | 60 | | Do. |
| 10 | 200 | 200 | $B_2O_3$ | 10 | (²) | 50 | 450 | 60 | | Good strong foam. Appeared to be rather dense. |
| 11 | 200 | 200 | $B_2O_3$ | 20 | (²) | 40 | 450 | 60 | | |
| 12 | 200 | 200 | $H_3BO_4$ | 6 | (²) | 45 | 450 | 60 | | Good strong foam of rather high density. |

¹ Extended time used to determine effect of long treatment on foam production.  ² Boiling.

2. A foamable silicate composition which comprises; sodium oxide and silicon dioxide having a $Na_2O/SiO_2$ molar proportion of about 1/1.75 and contains on the total composition weight about 7.7 weight percent $Fe_2O_3$, about 1.7 weight percent $MnO_2$, about 1.3 weight percent $Al_2O_3$, about 0.8 weight percent CaO, about 0.6 weight percent MgO and about 0.6 weight percent $TiO_2$.

References Cited by the Examiner

UNITED STATES PATENTS

| | | | |
|---|---|---|---|
| 2,237,037 | 11/1937 | Lytle | 65—22 |
| 2,620,597 | 12/1952 | Ford | 65—22 |
| 2,764,493 | 9/1956 | Vogelbeck | 106—51 X |
| 2,830,000 | 4/1958 | Labino | 161—196 |
| 2,837,873 | 6/1958 | Lynsavage | 65—22 |
| 2,955,947 | 10/1960 | Gmeiner et al. | 106—40 |
| 3,010,835 | 11/1961 | Charles et al. | 106—40 |
| 3,029,559 | 4/1962 | Treptow | 161—196 |
| 3,136,645 | 6/1964 | Dess | 106—40 X |
| 3,174,870 | 3/1965 | Connelly | 65—20 |

FOREIGN PATENTS 536,903   2/1957   Canada.

OTHER REFERENCES

Segnit: "Further Data on the System $Na_2O$—CzO—$SiO_2$," 251 Amer. J. of Sci., 586–601, published August 1953.

DONALL H. SYLVESTER, *Primary Examiner.*

EARL M. BERGERT, *Examiner.*

W. J. VAN BALEN, G. R. MYERS, *Assistant Examiners.*